United States Patent [19]

Rager et al.

[11] 4,197,359
[45] Apr. 8, 1980

[54] HUB FOR A DISK STORAGE MEDIUM

[76] Inventors: Edgar A. Rager, 5746 Canna La., San Jose, Calif. 95124; Barry B. Webber, 15290A Sycamore Ave., Morgan Hill, Calif. 95037

[21] Appl. No.: 874,195

[22] Filed: Feb. 1, 1978

Related U.S. Application Data

[60] Continuation of Ser. No. 758,193, Jan. 10, 1977, abandoned, which is a division of Ser. No. 624,425, Oct. 21, 1975, Pat. No. 4,013,492.

[51] Int. Cl.² .................. B65D 85/30; G11B 5/012
[52] U.S. Cl. .................................... 428/579; 428/596; 360/97; 346/137; 360/99
[58] Field of Search .............. 360/13 S, 98, 133, 97, 360/99; 204/38 B, 33, 34; 427/436; 74/572; 274/42 R; 206/444; 346/137; 335/302; 428/579, 596

[56] References Cited

U.S. PATENT DOCUMENTS

| | | | |
|---|---|---|---|
| 2,615,768 | 10/1952 | Schluchter | 427/436 X |
| 2,911,708 | 11/1959 | Fike et al. | 428/647 X |
| 3,037,205 | 5/1962 | Hagopian | 360/135 |
| 3,202,529 | 8/1965 | Dunlap, Jr. et al. | 204/38 B |
| 3,219,353 | 11/1965 | Prentky | 360/135 X |
| 3,244,581 | 4/1966 | Miller | 428/418 X |
| 3,401,026 | 9/1968 | Walker et al. | 427/436 X |
| 3,635,608 | 1/1972 | Crouch et al. | 206/444 |
| 3,672,964 | 6/1972 | Bellis | 204/38 B X |
| 3,711,363 | 1/1973 | Jarema et al. | 428/613 |
| 3,730,852 | 5/1973 | Diebold et al. | 204/38 B |
| 3,748,176 | 7/1973 | Gagliani | 75/44. 5 X |
| 3,749,010 | 7/1973 | Mentone | 204/38 B X |
| 3,751,345 | 8/1973 | Wilhelm et al. | 204/38 B X |
| 3,751,598 | 8/1973 | Muraoka | 360/135 X |
| 3,862,018 | 1/1975 | Mentone | 204/38 B X |
| 3,863,324 | 2/1975 | Ehrhardt | 360/135 X |
| 3,882,701 | 5/1975 | Wirth | 206/444 X |
| 4,013,492 | 3/1977 | Rager et al. | 204/33 |
| 4,104,135 | 8/1978 | Fujimaki et al. | 204/38 B X |

Primary Examiner—Carroll B. Dority, Jr.
Assistant Examiner—Randall L. Green
Attorney, Agent, or Firm—Thomas Schneck, Jr.

[57] ABSTRACT

A hub for a disk storage medium which is a unitary article of two dissimilar metals having a single plated coating. An example is an aluminum support member and a joined steel armature plate wherein the two metals have been joined, cleaned and plated on exposed surfaces, but without plating on joining surfaces.

1 Claim, 2 Drawing Figures

HUB FOR A DISK STORAGE MEDIUM

This is a continuation of prior application Ser. No. 758,193, filed Jan. 10, 1977, which in turn is a division of application Ser. No. 624,425 filed Oct. 21, 1975, now U.S. Pat. No. 4,013,492 issued Mar. 22, 1977.

BACKGROUND OF THE INVENTION a. Field of the Invention

This invention relates generally to an assembly of parts of different materials which are plated simultaneously and to a method of fabricating such an assembly, and more particularly to a method of preparing an assembly consisting of a plurality of parts of different materials, which parts are attached together before plating such an assembly and to an article fabricated in accordance with such a method.

b. Prior Art

When two or more parts of different materials which require plating are to be attached together in an assembly, it has generally been the practice in the past to fabricate, machine, and plate each part separately before assembling such parts. It has been considered impossible in the past to simultaneously plate certain different or dissimilar materials. Consequently, if two or more parts of an assembly are made of such incompatible materials, the only course available is to have each part fabricated, machined, and plated separately before assembly thereof.

It can be readily appreciated that if two or more parts of an assembly which are made of incompatible materials can be plated together, rather than separately, a number of distinct advantages are realized. If a plurality of parts can be assembled before being plated, it is generally possible to machine those parts as an assembly, thereby reducing the number of machining steps, the time required to perform the machining operation, and the cost of machining. In some instances, it is also possible to eliminate one or more machining steps which would be required if the parts are machined separately.

A considerable savings is realized in the plating process, since the time for preparing and plating the parts as an assembly rather than as separate parts, is considerably reduced. Furthermore, if two or more parts are plated as an assembly, the mating surfaces thereof need not and will not receive any plating material, thereby reducing the cost of plating materials needed in the plating process.

Another advantage is gained if it is possible to machine two or more parts as an assembly, rather than separately and before they are attached together. If two parts are machined separately, it is obvious that a relatively great degree of accuracy in their relative positions after they are assembled cannot be attained without a considerable amount of time and effort and the use of a sophisticated equipment. However, if two parts are machined after they are assembled, the common machined surfaces thereof will be accurately positioned with respect to one another within the tolerance of the machine operation. Of course, the tolerance of a machine operation is generally much less than the tolerance which can be attained by positioning two previously machined parts with respect to one another and securing the two together.

In some instances, it is possible to employ a different and better means of attaching two parts together if such parts are attached before they are plated. For example, it may not be possible to employ a bonding agent to attach two parts together after they have been plated separately. It can also be appreciated that the means employed for attaching two parts together must be capable of permitting the two parts to be positioned relative to one another if the machining operation is performed first.

It can be appreciated, therefore, that a considerable savings and a more superior product can be realized if two or more dissimilar metals can be joined together during the machining and plating operations. That is, if such a unitary article can be made of two or more such dissimilar metals which then can be machined, cleaned and plated as a unitary article, manufacturing costs are reduced considerably and permissible tolerances can be achieved more easily.

If the dissimilar metals are steel and aluminum, it has always been considered an imposition in the past to employ the same cleaning and activating agents for such metals in preparing them for plaint. More particularly, the cleaning agent for steel tends to remove the metallic elements from the aluminum alloy leaving a layer of residue in the form of smut. It was considered impossible in the past for any nickel plating adhesion to occur over this layer of smut. Also, the cleaning agent normally employed for aluminum tends to attack the steel.

It has been the practice in the past to prepare an aluminum die cast member as follows: (1) machine the member to permissible tolerances; (2) vapor degrease with the vapors of trochloroethylene for a period of 3 to 5 minutes; (3) clean the member with a heated caustic solution to remove surface metal for a period of 30 seconds to 5 minutes and then rinse with water; (4) remove the remaining smut with nitric bifloride for a period of 30 seconds and then rinse with water; (6) repeat steps 3–5 as often as necessary to clean the member; (7) dip the member in a zincate solution for a period of 2 minutes and then rinse with water; (8) plate the member, such as with electroless nickel plating.

It has been the practice in the past to prepare a steel member in accordance with the following process: (1) machine or grind to permissible tolerances; (2) vapor degrease with heated trichloroethylene for a period of 3 to 5 minutes; (3) clean with a heated alkaline solution and a six volt direct current potential for a period of 3 to 5 minutes and then rinse with water; (4) remove smut from the member by contacting it with muriatic acid for a period of 3 to 5 minutes and then rinse with water; (5) repeat steps 3 and 4 as often as necessary to clean the member; and (6) thereafter plate the member, such as with electroless nickel plating.

After two such parts have been prepared in accordance with the above, they are attached together, such as by bolts, to form a unitary article. It can be appreciated, however, that the necessity for machining each member separately reduces the degree of accuracy which can be obtained in the final position of the two members with respect to one another. Furthermore, it can be appreciated that the machining and plating of two members independently is considerably more costly than the machining and plating of a unitary article formed of two such members joined together.

SUMMARY OF THE INVENTION

A primary object of the present invention is to provide a method of simultaneously preparing two or more dissimilar metals for simultaneous plating of both. Another object of the present invention is to provide an article constructed in accordance with such a method which is greatly superior to prior known similar articles.

In summary, two dissimilar metals of selected classes are separately cleaned, then bonded together with epoxy. The article is then machined to desired tolerances. Next, the article is degreased, then placed in an acid bath and rinsed. The acid bath and rinse are repeated, then the article is dipped in zincate, rinsed and plated.

In the prior art cleaning solution effective for metals like aluminum would dissolve metals like steel, while cleaning solution effective for metals like steel would dissolve metals like aluminum.

We have found effective concentrations and temperatures which allow simultaneous cleaning of dissimilar metals which may be joined together so that thereafter the joined article may be plated as a unit.

The invention will be more readily understood with reference to the accompanying drawing.

DESCRIPTION OF THE PREFERRED EMBODIMENT

Figure 1:
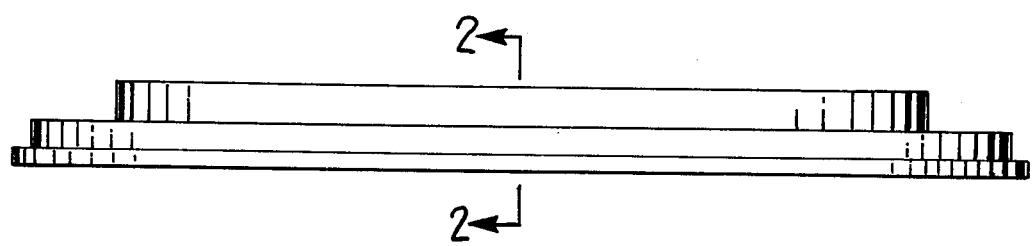
FIG. 1 is a view in elevation of a two part unitary article constructed in accordance with the principles of the present invention.
Figure 2:
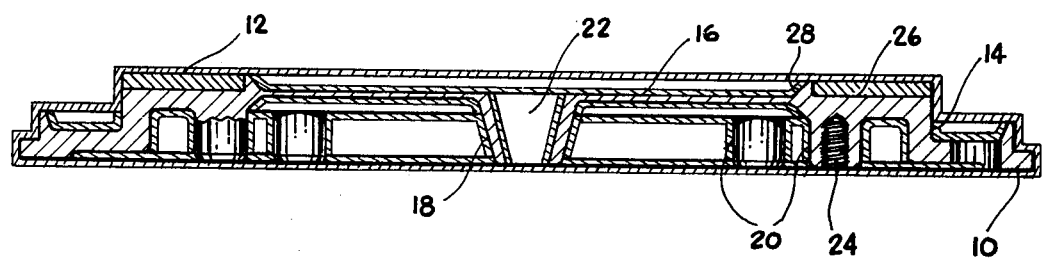
FIG. 2 is a sectional view taken generally along line 2—2 of FIG. 1.

With reference to FIGS. 1 and 2, there is shown an article which can be manufactured in accordance with the method of the present invention. The illustrated article is a hub for a disc pack and is formed of an aluminum member 10 and a steel, ferromagnetic ring 12. The member 10 is die cast aluminum and includes an annular flange section 14, a relatively thin and flexible center section 16, a boss 18 centrally located on the section 16, and a plurality of mounting bosses 20 mounted on the annular flange section 14. A tapered centering aperture 22 is provided in the boss 18 and is disposed for receiving the tapered end of a spindle (not shown) therein for centering the hub. Each boss 20 is provided with a threaded aperture 24 for receiving suitable threaded members therein for attaching a memory storage disk into the hub, both of which are not shown. An annular flange 26 extends from one surface of the member 10 to form a shoulder 28. An inner periphery of the ring member 12 engages the shoulder 28, such that the ring member 12 is concentrically aligned on the member 10. The concentricity of the shoulder 28 can be maintained with a relatively great degree of accuracy, since it is machined on a lathe. With the shoulder 28 employed to position the ring member 12, it will also be accurately positioned with respect to the centering aperture 22.

The member 12 is ferromagnetic so that the hub can be pulled down onto the center spindle by an associated electromagnet, not shown. When the hub is thus positioned, its center section 16 flexes to permit seating of the ring member 12 on the electromagnet. In accordance with the present invention, the member 10 and the ring 12 are prepared as follows.

The member 10 and the ring 12 are cleaned separately with a trichloroethylene solution and then bonded together with any suitable bonding material, such as aircraft type resin base epoxy. The flange 26 prevents such bonding material from escaping from between the members 10 and 12. When the bonding material has cured, the unitary article is machined or ground to permissible tolerances and then prepared for plating in accordance with the following.

The unitary article is first degreased by subjecting it to the vapor of heated trichloroethylene for a period of two to five minutes. Thereafter, the steel ring 12 is cleaned by scrubbing it with an alkaline cleaner and then the entire article is cleaned with heated alkaline cleaner without any potential applied thereto for a period of twelve to fifteen seconds. The alkaline cleaners employed in the presetn example were "Wyandotte Aldet" and "Wyandotte Ferlon" manufactured by BASF Wyandotte Corporation. The cleaners are diluted with water in the following proportions: eight ounces of "Wyandotte 90" per gallon of water; and four ounces of "Wyandotte Ferlon" per gallon of water. The solutions are heated to 150° F. prior to use.

After the article is rinsed with water at ambient temperature, 70° F. it is subjected to muriatic acid pickle for a period of two to ten seconds and then rinsed again with water. The muriatic acid is maintained at ambient temperature, 70° F., and is in a solution of 10%–20% by volume of muriatic acid. It is this concentration of muriatic acid which allows the two dissimilar metals to be cleaned simultaneously, rather than having to mask over one metal, such as aluminum, while cleaning the other.

The above steps, with the exception of the vapor degrease step, are repeated once again and then the article is dipped in a solution of zincate for a period of 15 to 45 seconds for preservation of the surface activation achieved by the acid pickle. Thereafter, the article is rinsed with water and then subjected to the plating operation, such as electroless nickel plating.

It can be appreciated from the above that the process according to the present invention eliminated the step of precision grinding the ring 12, since it is machined with the aluminum member 10 after it is bonded thereto. Furthermore, the member 10 and ring 12 are prepared for plating and plated as a unitary article, rather than as separate members, thereby saving in preparation time. Additionally, the mating surfaces of the member 10 and the ring 12 are not plated according to the practice of the prior art, thereby saving plating material.

It can also be appreciated that the accuracy of concentricity of the two members 10 and 12 is greatly increased over previous fabrication techniques. In the past, the ring 12 was precision ground for flatness before being attached to the member 10. The use of bolts to attach the member 12 to the member 10 usually altered the flatness of the ring member 12, thereby producing inaccuracies in its subsequent use.

Other materials can also be employed for the members 10 and 12, rather than steel and aluminum, respectively. The member 12 can be made of any ferromagnetic material, brass or copper. The member 10 can be made of magnesium, rather than aluminum. Once it is recognized that two dissimilar metals can be plated simultaneously, the concept of the present invention can be extended to other combinations of metals.

We claim:

1. A hub construction for use in holding a disk storage medium comprising,
   a disk-shaped support member with first and second opposed sides and having a receiving means for attaching a memory storage disk to said first side and having a surface on said second side for receiving a ring member, said support member made of aluminum, a generally flat ring member having a surface mating with the ring member receiving surface on the second side of said support member, said mating surfaces joined together without any plating material therebetween by a bonding material, said ring member made of a ferromagnetic material and adapted to magnetically engage a magnet associated with a spindle, and a layer of metal plating material completely covering exposed non-mating surfaces of said members.

* * * * *